(12) United States Patent
Berkey

(10) Patent No.: US 6,317,552 B1
(45) Date of Patent: Nov. 13, 2001

(54) DISPERSION MANAGED OPTICAL WAVEGUIDE FIBER

(75) Inventor: George E. Berkey, Pine City, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/485,350
(22) PCT Filed: Jul. 23, 1998
(86) PCT No.: PCT/US98/15274
§ 371 Date: Feb. 7, 2000
§ 102(e) Date: Feb. 7, 2000
(87) PCT Pub. No.: WO99/08142
PCT Pub. Date: Feb. 18, 1999

Related U.S. Application Data

(60) Provisional application No. 60/054,821, filed on Aug. 7, 1997.

(51) Int. Cl.[7] .................................................. G02B 6/02
(52) U.S. Cl. ............................ 385/127; 385/123; 359/161
(58) Field of Search .................................... 385/123, 124, 385/126, 127; 359/161, 154

(56) References Cited

U.S. PATENT DOCUMENTS

| | | | | |
|---|---|---|---|---|
| 4,149,772 | * | 4/1979 | Iyengar et al. | 385/123 |
| 4,715,679 | * | 12/1987 | Bhagavatula | 385/123 |
| 5,568,583 | * | 10/1996 | Akasaka et al. | 385/123 |
| 5,684,909 | * | 11/1997 | Liu | 385/127 |
| 5,999,679 | * | 12/1999 | Antos et al. | 385/127 |

* cited by examiner

Primary Examiner—Cassandra Spyrou
Assistant Examiner—Euncha Cherry
(74) Attorney, Agent, or Firm—William J. Chervenak

(57) ABSTRACT

Disclosed is a single mode optical waveguide fiber designated for compensating for positive dispersion in optical telecommunications systems. A key characteristic of the invention is that the novel dispersion compensating waveguide, viz., a waveguide having large negative dispersion, contains no dopants, such as fluorine, which lower the refractive index of silica. A refractive index profile design which includes a high refractive index center segment (5) surrounded by a plurality of alternating high (6, 10, 13) and low refractive index segments, provides a dispersion compensation fiber which has the optical properties required for the system to be compensated without sacrificing bend resistance, increasing splicing loss, or elevating polarization mode dispersion.

12 Claims, 5 Drawing Sheets

DISPERSION MANAGED OPTICAL WAVEGUIDE FIBER

This application is a 371 of PCT/US98/15274 filed Jul. 23, 1998 which claims benefit of 60/054,821 filed Aug. 7, 1997.

BACKGROUND OF THE INVENTION

The invention is directed to an optical waveguide fiber having a multi-ring core design which provides for large negative dispersion. In particular, the large negative dispersion is achieved while maintaining low bend loss, low splice loss, and polarization mode dispersion comparable to that of the waveguide fiber comprising the link to be compensated.

Many telecommunications links designed to operate in a wavelength window near 1300 nm have been installed. In general the waveguides manufactured for such links were designed to have a zero dispersion wavelength near 1300 nm to avoid signal distortion due to dispersion over long, unregenerated link lengths. More recently, the capability of operating at a wavelength window near 1550 nm has been developed. The 1550 nm window is advantageous because the attenuation of a silica based waveguide has a minimum there and the window lies near the center of the erbium doped optical amplifier gain curve. In fact, for a typical waveguide the attenuation near 1550 nm is less than 60% of the attenuation near 1300 nm. This large gain in signal to noise ratio as well as the possibility of extending link length without adding regenerators has made telecommunications operations at 1550 nm very attractive.

However, if a telecommunication link originally made for 1300 nm window operation is to be upgraded to include 1550 nm operation, the dispersion penalty due to the location of the dispersion zero must be overcome. Because the waveguides in these links weredesigned to have zero dispersion near 1300 nm, the dispersion at 1550 nm increases rapidly with link length. The dispersion at 1550 nm is typically about 15–20 ps/nm-km.

Two strategies which may be used to remove the 1550 nm dispersion penalty are:
- employ very narrow line width 1550 nm lasers; or,
- introduce dispersion compensating waveguide fiber into the link.

A dispersion compensating waveguide fiber is one which has a dispersion of opposite sign relative to the link dispersion which is to be compensated. For example, a 1300 nm telecommunications system may have 18 ps/nm-km dispersion at 1550 nm. A link length of 60 km is common. Thus, for 1550 nm operation over this link 1080 ps per nm of laser line width must be compensated to avoid a dispersion penalty. Even though very narrow line width distributed feedback lasers have been developed a considerable amount of dispersion remains to compensated at operating wavelengths far from the zero dispersion wavelength. Thus the dispersion compensating waveguide fiber can be used to advantage in systems employing very narrow linewidth lasers as well as lasers having a relatively broad emission band.

The technical innovations required to implement either of these strategies are sophisticated. In the case of the compensation waveguide strategy, waveguide core profiles which provide the proper amount of compensating dispersion must be found. The problem is complicated by the fact that changing the core refractive index profile to obtain a negative, i.e., compensating, dispersion, changes other properties of the waveguide. In particular, waveguide fibers having negative dispersion have been found to be more susceptible to bending loss, have higher polarization mode dispersion, and increased attenuation when compared to the original waveguide fiber used in the system. See, for example U.S. Pat. No. 5,361,319, Antos, et al.

The telecommunications industry, therefore, has a need for a dispersion compensating waveguide fiber which:
- is resistant to bending loss;
- has a high negative dispersion so that the compensating fiber length is relatively short,
- has a low attenuation;
- exhibits low splice loss with the original system waveguide; and,
- has comparatively low polarization mode dispersion.

DEFINITIONS

The radius or width of the regions of the core are defined in terms of the index of refraction of the core along a radius. A particular region begins at the point where the refractive index characteristic of that region begins and ends at the last point where the refractive index is characteristic of that region. Radius and width will be expressed in terms of these beginning and ending points unless otherwise noted in the text.

An alpha refractive index profile is $n=n_0(1-\Delta(r/a)^\alpha)$, where $n_0$ is the refractive index at the first point of the alpha index profile, $\Delta$ is defined below, r is radius, and a is the radius measured from the first to the last point of the alpha index profile, and r is chosen to be zero at the first point of the alpha index profile.

The width of an index profile segment is the distance between two vertical lines drawn from the respective beginning and ending points of the index profile segment to the horizontal axis of the chart of refractive index vs. radius.

The % index delta is $\% \Delta=[(n_1^2-n_c^2)/2n_1^2]\times 100$, where $n_1$ is a core index and $n_c$ is the clad index. Unless otherwise stated, $n_1$ is the maximum refractive index in the core region characterized by a % $\Delta$.

The zero reference for refractive index is chosen as the minimum refractive index in the clad glass layer. A region of refractive index in the core which is less than this minimum value is assigned a negative value.

Bend performance is defined by a standard testing procedure in which the attenuation induced by winding a waveguide fiber about a mandrel is measured. The standard test calls for waveguide fiber performance with one turn about a 32 mm mandrel and with 100 turns about a 75 mm mandrel. The maximum allowed bending induced attenuation is usually specified in the operating window around 1300 nm and around 1550 nm.

SUMMARY OF THE INVENTION

The invention set forth in this application meets the need for a high performance dispersion compensating optical waveguide fiber without using fluorine.

A first aspect of the invention is a dispersion compensating single mode optical waveguide fiber having a central core region surrounded by a clad layer. To make the structure a waveguide, at least a portion of the core refractive index must be higher than the maximum refractive index of the clad layer which abuts and surrounds the core region. The core region of the novel dispersion compensating waveguide comprises at least five segments, a center segment symmetric about the long axis of the waveguide, and at least four annular segments symmetrically layered about the center segment. The center segment has a relative index, $\Delta_c\%$, which is in the range of 1.5% to 3.5%. The upper limit on $\Delta_c\%$ depends upon what is practical in terms of doping capability and in terms of added attenuation as dopant percent increases. Large negative dispersion can be obtained using a center relative index higher than 3.5%, but dopant levels high enough to produce such an index are usually impractical and not cost effective. A preferred range for $\Delta_c\%$ is 2% to 3%.

The magnitudes of the relative indexes are all positive and are chosen as follows: the center relative index is largest; the successive odd numbered surrounding segments or layers, beginning with the number 1 for the layer abutting the center segment, are smaller in magnitude than $\Delta_c\%$; the successive even numbered surrounding layers are smaller in magnitude than $\Delta_c\%$ but larger in magnitude than the odd numbered layers.

The center segment is characterized by a radius and the successive annular segments are characterized by widths. The novelty of the waveguide structure is defined by the choice of relatives indexes, $\Delta\%$, and the center radius and widths of the annular segments which make up the core. In particular, the $\Delta\%$'s and radius and widths are chosen such that the total dispersion of the waveguide is more negative than about −85 ps/nm-km. The waveguide attenuation depends upon the relative index of the center segment, $\Delta_c\%$. For $\Delta_c\%$ near 2% the attenuation is less than about 0.55 dB/km over a pre-selected band of wavelengths which lies in the wavelength range 1520 nm to 1600 nm. A wavelength of choice is near 1550 nm, which is an optimum operating wavelength for telecommunications. Average attenuation of 0.46 to 0.48 dB/km is typical for waveguide profiles having $\Delta_c\%$ near 2%. As $\Delta_c\%$ approaches 3% to 3.5%, the upper limit of attenuation is about 1.5 dB/km. However, the higher $\Delta_c\%$ profiles yield a larger negative dispersion, which means a shorter length of compensating waveguide is required. The novel dispersion compensating waveguide may be tailored for uses in which a longer length, lower attenuation waveguide is preferred as well as for uses in which a shorter length of waveguide is preferred, thereby requiring the waveguide to have a larger negative dispersion.

Further, the novel waveguide is characterized by an average splice loss of 0.5 dB and a bend loss no greater than 0.025 dB. The splice loss refers to splicing between the compensating waveguide and a waveguide in the system being compensated, which is usually a step index waveguide which is a standard in the industry. The bend resistance refers to the mandrel tests described in the definitions section.

In addition, the polarization mode dispersion is substantially the same as that for the waveguides of the system being compensated. Thus, the polarization mode dispersion may be expected to be no greater than about 0.5 ps/km$^{1/2}$.

In any of the embodiments described above, the shape of the respective core segments can be chosen from among the group of $\alpha$-profiles, rounded step profiles, or trapezoidal profiles. The preferred shape is an $\alpha$-profile with $\alpha$=0 to 6 or a rounded step. Of these, the $\alpha$=1 to 2 is a most preferred profile.

The $\Delta\%$'s of the even numbered annular segments or layers lie within the range of 0.2 to 0.6 of the center relative index, $\Delta_c\%$. As is noted above, the odd numbered segments are lower in magnitude than the even numbered segments. A particular embodiment of the invention has odd numbered segments for which the relative indexes are flat and close to zero.

A detailed embodiment of the 5 segment core (4 annular segments), in which the overall core radius is in the range 12 $\mu$m to 18 $\mu$m, is given in an example below.

Another embodiment described in detail below is a 7 segment core, i.e., one having 6 annular segments, in which the overall core radius is in the range 15.5 $\mu$m to 23.5 $\mu$m.

DESCRIPTION OF THE PREFERRED EMBODIMENTS

The novel refractive index profile described herein achieves the goal of large negative dispersion while retaining the advantageous properties of relatively low attenuation, low splice loss and bend loss, and polarization mode dispersion comparable to that of standard single mode optical waveguide fiber. In addition, the large negative dispersion is achieved without recourse to the use of dopants, such as fluorine, which reduce refractive index to less than that of silica. Use of fluorine can add several steps to the waveguide manufacturing process. Also, the placement is such that dopant type or concentration interfaces occur in the light carrying region of the waveguide. Thus a process which eliminates fluorine greatly facilitates and cost reduces the manufacturing process.

The large negative dispersion provides for dispersion compensation using a relatively short length of compensating waveguide fiber, thus limiting the additional attenuation introduced into the system being compensated.

Figure 1:
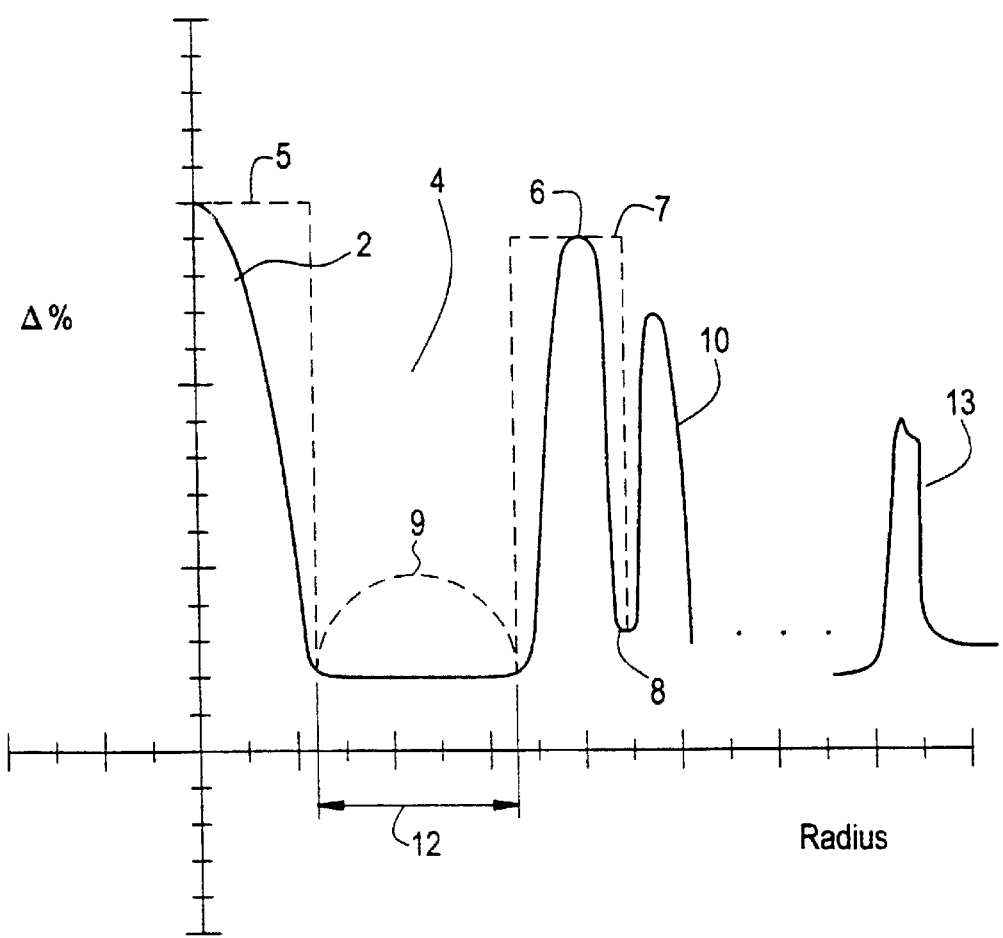
FIG. 1 is an illustration of the novel index profile showing the center segment and the annular core layers.

A general profile illustrative of the novel refractive index is shown in FIG. 1 which is a chart of relative index vs. waveguide radius. The main features of the refractive index profile are the high index center segment 2, the abutting annulus 4 of lower index, and a plurality of higher index rings exemplified by rings 6, 10, and 13. Alternative shapes for the respective center segment, low index segment and higher index segment are shown as dashed curves 5, 9, and 7. The definition of the width of an annular region is shown by horizontal axis segment 12. The end points defining the width may be conveniently chosen as the points at which the refractive index slope changes rapidly or changes from a constant as in the detailed embodiments given below. Note that the annular width is measured along the horizontal axis, i.e., the $\Delta$=0 line. Another major feature of the refractive index profile is that $\Delta\%$ is nowhere negative, wherein silica is the reference refractive index. Thus the advantageous characteristics of the novel waveguide are achieved without resorting to index lowering dopants which typically are more difficult to incorporate and control. That is, undesirable multiple process steps and the introduction of an interface in the light carrying region of the waveguide are advantageously avoided.

Figure 2:
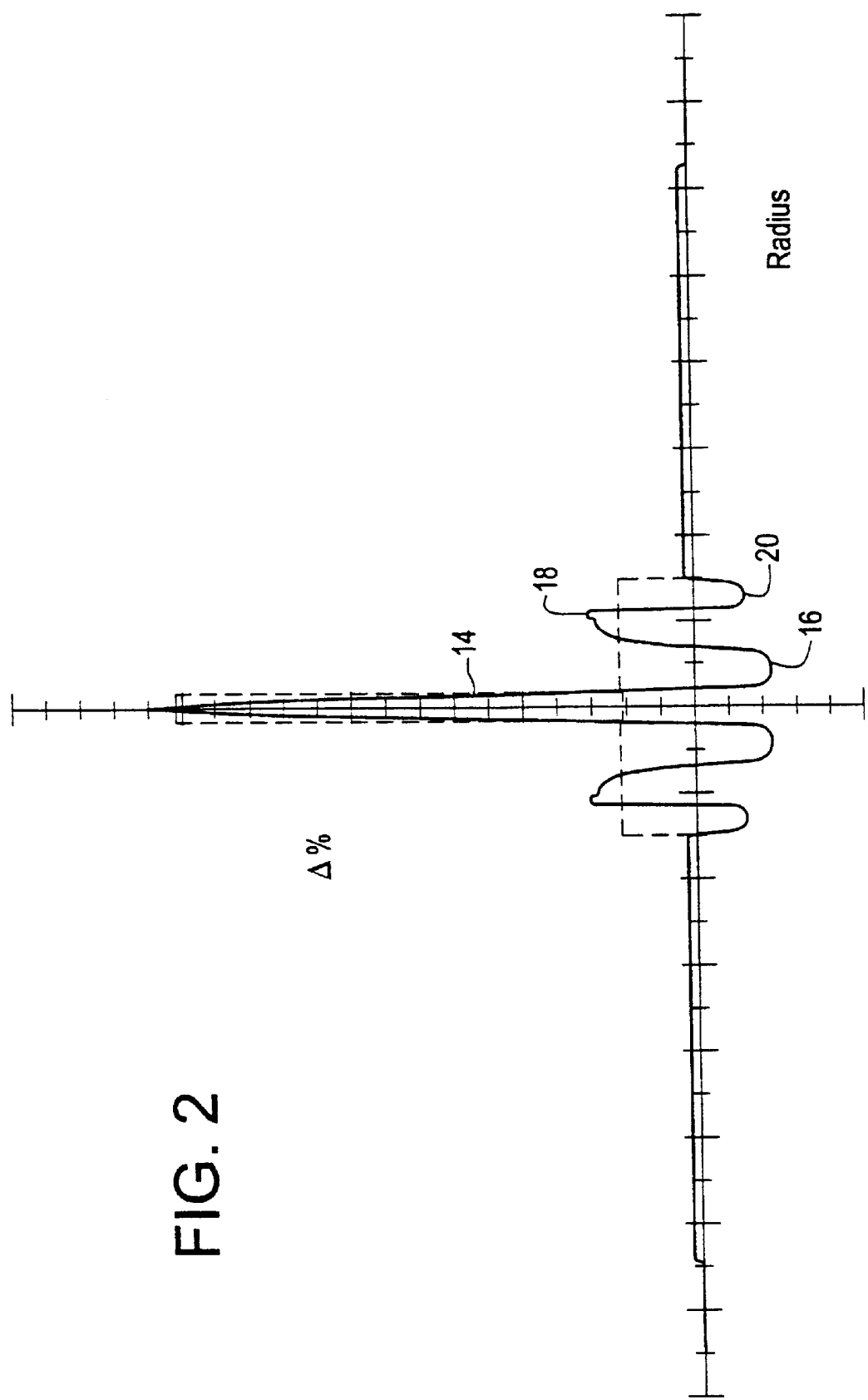
FIG. 2 is a measurement of a waveguide profile in which certain of the core segments have an index less than the clad index.

A measured refractive index profile of a prior art dispersion compensating waveguide is shown in FIG. 2. Two regions of the core index profile, the center segment 14 and the ring segment 18 have positive $\Delta\%$. Both of the lower index segments, annular segments 16 and 20, have a minimum index which is negative, meaning that the two segments contain an index towering dopant. A negative dispersion more negative than −70 ps/nm-km is possible using this profile design. However, in part due to the width and positioning of annular segment 18, the bend and splicing performance and the polarization mode dispersion of the waveguide are not as good as standard single mode fiber. This performance deficiency together with the requirement of negative Δ%'s prompted the investigation of alternative profiles.

Figure 3:
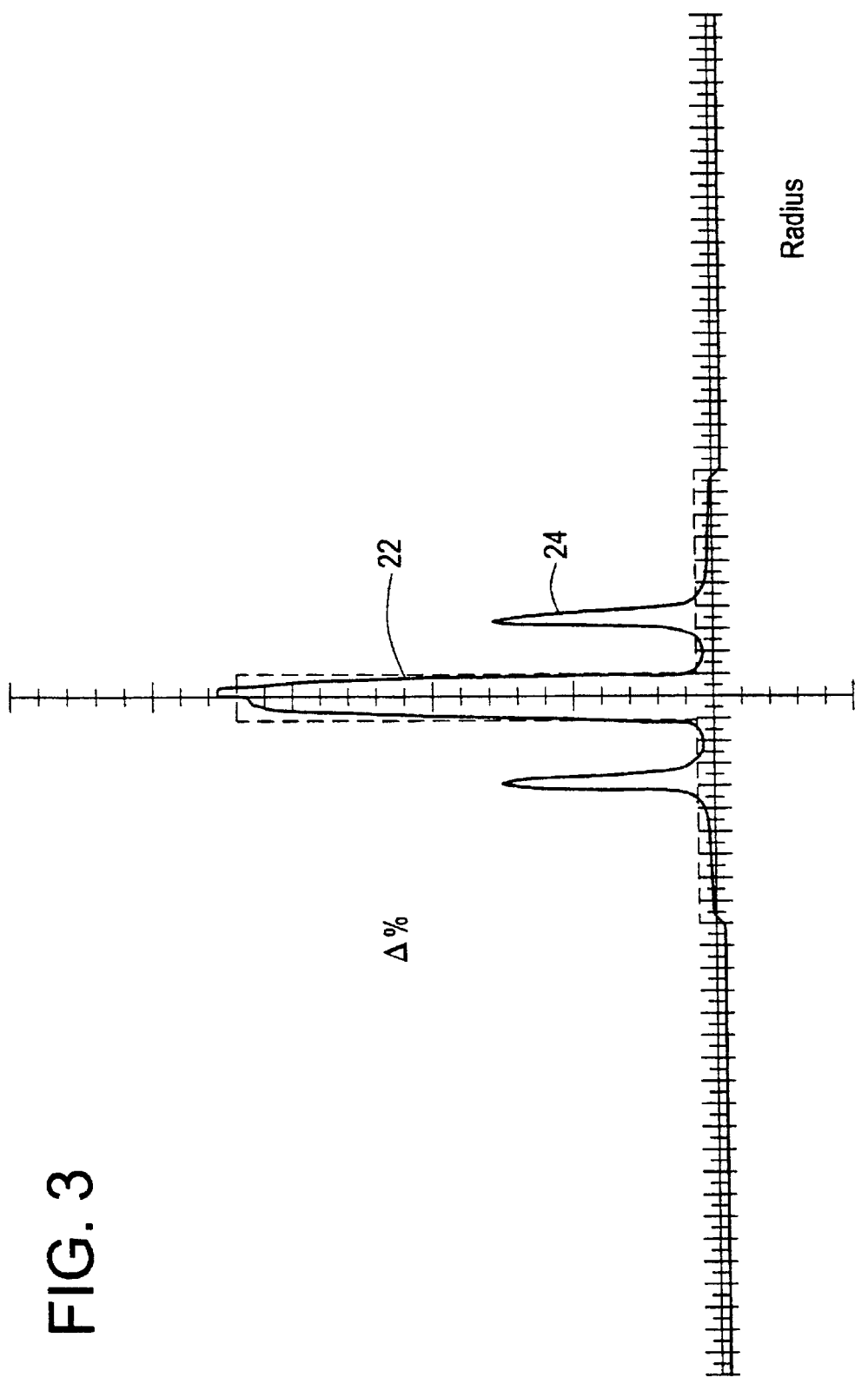
FIG. 3 is an index measurement of a 3 segment profile.

A measurement of a three segment profile is shown in FIG. 3. The center segment 22 is abutted by a low index annular segment 23 which in turn is abutted by a higher index annular ring 24. The design is simpler than that of FIG. 2 and the narrowing of annulus 24 as compared to annulus 18 of FIG. 2, provides for improved bend and splicing performance. However, the dispersion was found to be about −65 ps/nm-km which increases the length of the dispersion compensating fiber and so introduces a greater attenuation into the dispersion compensated system.

Figure 4:
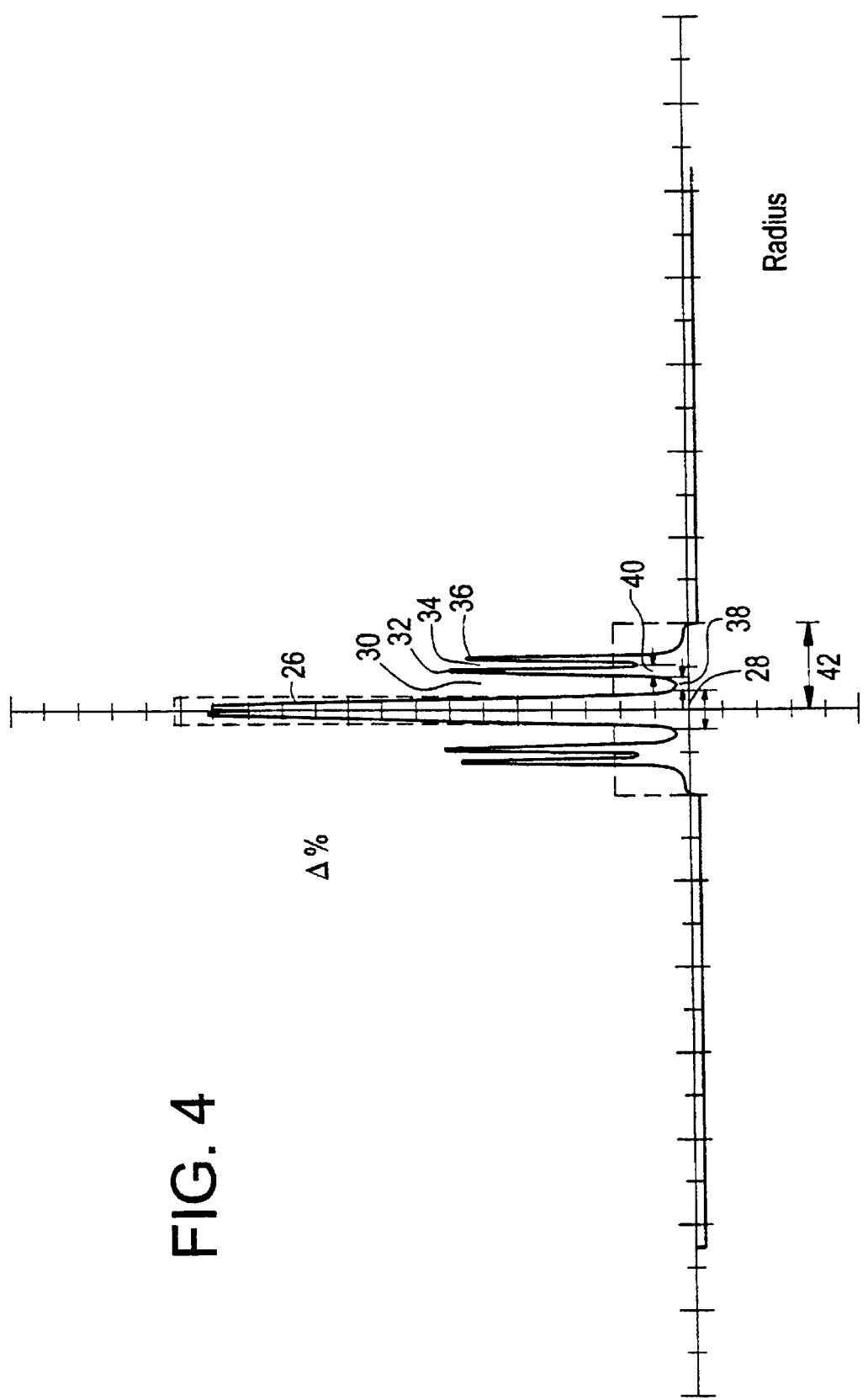
FIG. 4 is an index measurement of a 5 segment profile.

By comparison the novel refractive index profile shown measured in FIG. 4 provides for a dispersion more negative than about −85 ps/nm-km. The center segment, 26, has a Δ% is in the range of 1.5 to 3.5%.

In an embodiment in which $\Delta_c\%$ is 2%, the radius 28 of the central segment is in the range 2 $\mu$m to 3 $\mu$m. The remainder of the core comprises four annular segments, 30, 32, 34, and 36, surrounding the center segment. The respective relative indexes follow the rule, $\Delta_c\% > \Delta_2\% \geq \Delta_4\% > \Delta_1\% \geq \Delta_3\% \geq 0$. The widths of the, for this case in which $\Delta_c\%$ is 2%, respective annular segments, $w_1$, $w_2$, $w_3$, and $w_4$ are in the ranges 2.4 $\mu$m to 3.6 $\mu$m, 1.6 $\mu$m to 2.4 $\mu$m, 0.8 $\mu$m to 1.2 $\mu$m, and 1.6 $\mu$m to 2.4 $\mu$m. In this case the widths are taken as the points at the beginning and end of a segment at which the slope of the index profile changes from a constant value. This definition of width is illustrated in FIG. 4 as lines 38 and 40. The total core radius 42, which is the sum of the central radius, the segment widths, and the index down taper to the clad layer index is 12 $\mu$m to 18 $\mu$m.

As $\Delta_c\%$ tends toward its upper limit of about 3.5%, the radius of the central region is reduced, For example at $\Delta_c\%=3\%$, the radius of the central segment is in the range 1.2 $\mu$m to 1.8 $\mu$m. The widths of the remaining segments are not changed appreciably. The Δ%'s of the annuli 32 and 36 lie in the range of 0.2 to 0.6 of center relative index $\Delta_c\%$. The Δ% of the low refractive index annular segments 30 and 34 are typically less than 20% of the higher index annular ring segments and may be advantageously chosen to be at or near 0.

The novel refractive index profile illustrated in FIG. 4 has a high negative dispersion as well as good bend resistance and low splice loss. In addition, the other optical properties of the novel waveguide are such that it is suitable for use as a dispersion compensating waveguide. The high negative dispersion allows for compensation of positive dispersion in a telecommunications link using a relatively short length of the compensating waveguide. The relatively low attenuation, which can be less than 0.5 dB/km, depending upon choice of $\Delta_c\%$, of the compensating length of waveguide allows for acceptable signal to noise ratio in the system without need for an additional signal regenerator.

Figure 5:
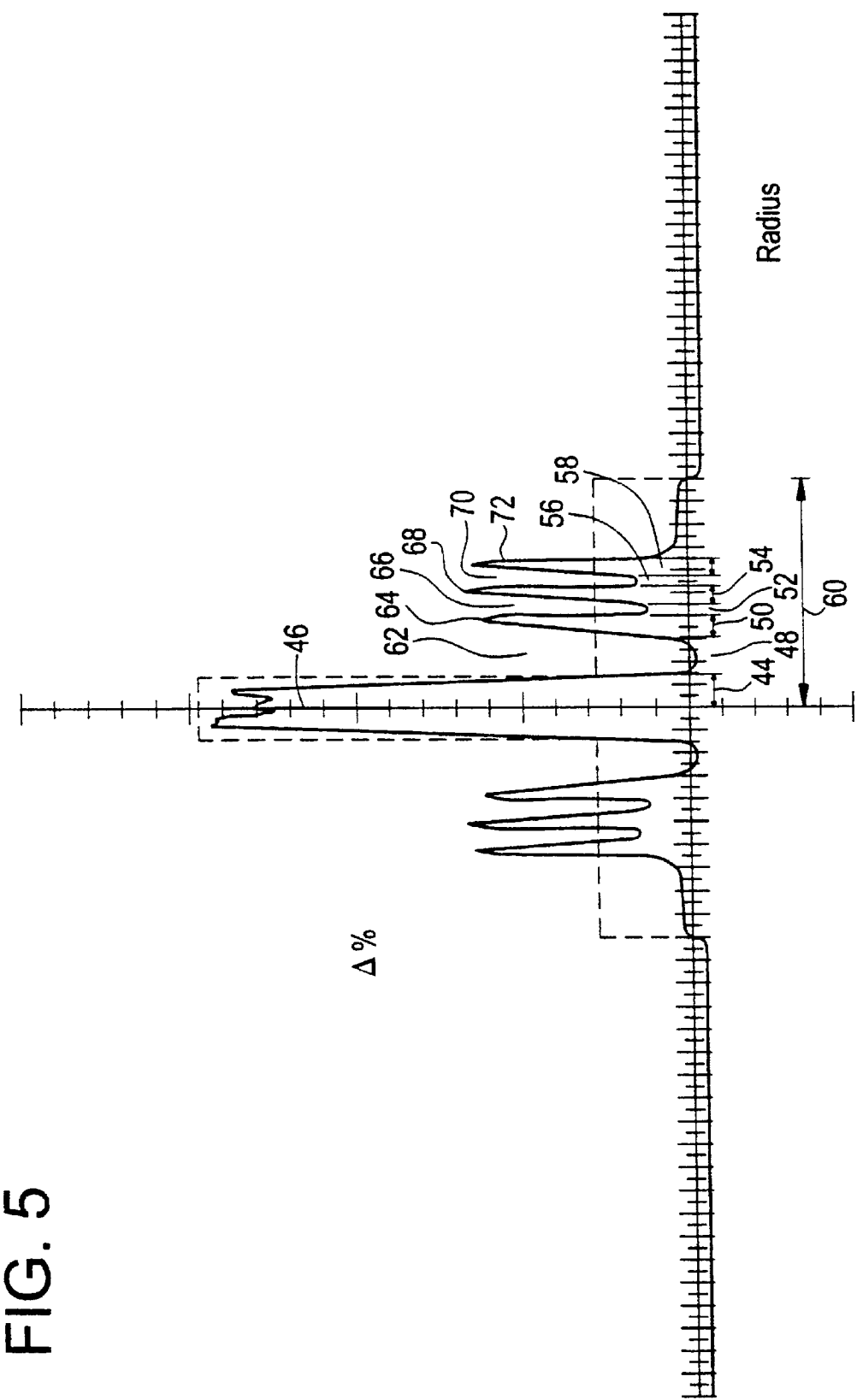
FIG. 5 is an index measurement of a 7 segment profile.

The seven segment embodiment of the novel refractive index is illustrated in FIG. 5. In the case in which $\Delta_c\%$ is about 2%, the central segment 46 has radius 44 in the range 2 $\mu$m to 3 $\mu$m and the respective widths $w_1$, $w_2$, $w_3$, $w_4$, $w_5$, and $w_6$, which are shown as 48, 50, 52, 54, 56, and 58 in FIG. 5., are in the ranges 2.9 $\mu$m to 4.4 $\mu$m, 1.25 $\mu$m to 1.90 $\mu$m, 0.75 $\mu$m to 1.10 $\mu$m, 0.9 $\mu$m to 1.35 $\mu$m, 0.9 $\mu$m to 1.35 $\mu$m, and 1.65 $\mu$m to 1.10 $\mu$m. These widths are defined as stated above in the 5 segment embodiment. The total core radius 60, which is the sum of the central radius, the segment widths, and the index down taper to the clad layer index is 15.70 $\mu$m to 23.50 $\mu$m.

The relative indexes of the core having seven segments, 46, 62, 64, 66, 68, 70 and 72, follow the rule, $\Delta_c\% > \Delta_2\% \geq \Delta_4\% \geq \Delta_6\% > \Delta_1\% \geq \Delta_3\% \geq \Delta_5\% \geq 0$. As $\Delta_c\%$ moves toward its upper limit of 3.5%, the central segment radius 44 decreases. For example, at $\Delta_c\%=3\%$, the radius of the central segment is in the range 1.2 $\mu$m to 1.8 $\mu$m. The widths of the remaining segments are not changed appreciably. as stated for the embodiment of FIG. 4 described immediately above. The three high index annular segments 64, 68, and 72 are in the range of 0.2 to 0.6 of the center relative index $\Delta_c\%$. The Δ% of the low refractive index annular segments 62, 66, and 68 are typically less than 20% of the higher index annular ring segments and may be advantageously chosen to be at or near 0.

The formation of a very high Δ% center together with a set of high Δ% annular segments spaced apart from the center segment and from each other by low index segments provides the surprising characteristic of large negative dispersion combined with excellent confinement of the signal light as shown by the good bend resistance.

Additional unusual and advantageous results are:

attenuation is low;

cut off wavelength is compatible with the original system;

splice loss is low; and, polarization mode dispersion is not degraded relative to the original system.

Although particular embodiments of the invention have been disclosed and described herein, the invention is nonetheless limited only by the following claims.

I claim:

1. A dispersion compensating single mode optical waveguide fiber comprising:

a central core glass region, surrounded by and in contact with a clad glass layer, at least a portion of the core glass region having a refractive index higher than the maximum refractive index of the clad layer, the central core glass region having a center, a refractive index profile, and a radius, and the clad glass layer having a refractive index profile, in which, the refractive index profile of the central core region includes at least five segments, a center segment having a cross sectional area distributed substantially symmetrically about the core center and having a relative index $\Delta_c\%$, which is in the range of 1.5% to 3.5%, and a radius, a number j of annular segments surrounding the center segment beginning with a first annular segment abutting the center segment, a second annular segment abutting the first annular segment and a jth annular segment abutting the (j−1)th segment to form a core having a center segment and j annular segments, the respective annular segments having a relative index $\Delta_j\%$ and a width, $w_j$, measured along the Δ%=0 line, where j is an integer ≧4;

in which $\Delta_c\% > \Delta_j\% \geq 0$ for all values of j, and $\Delta_j$ for j an even number is greater than $\Delta_j$ for j an odd number;

in which the respective relative indexes, the center segment radius and annular segment widths are selected to provide a dispersion more negative than about −85 ps/nm-km at a pre-selected wavelength.

2. The dispersion compensating single mode waveguide of claim 1 in which the attenuation is no greater than about 1.5 dB/km, and for $\Delta_c\%$ near 2% is no greater than 0.55 dB/km, over a pre-selected band of wavelengths contained within the range 1520 nm to 1600 nm, and a splice loss which has an average of 0.5 dB for splices between the dispersion compensating waveguide and standard step index single mode telecommunication waveguide fiber.

3. The dispersion compensating single mode waveguide of claim 1 in which j=4 and the respective relative indexes are such that $\Delta_c\% > \Delta_2\% \geq \Delta_4\% > \Delta_1\% \geq \Delta_3\% \geq 0$ and the core radius is in the range 12 μm to 18 μm.

4. The dispersion compensating single mode waveguide of claim 1 in which j=6 and the respective relative indexes are such that $\Delta_c\% > \Delta_2\% \geq \Delta_4\% \geq \Delta_6 > \Delta_1 \geq \Delta_3\% \geq \Delta_5\% \geq 0$ and the core radius is in the range 15.5 μm to 23.5 μm.

5. The dispersion compensating single mode waveguide of claim 3 or 4 in which the segments comprising the core each have a shape, the shape of the center segment selected from the group consisting of an α profile, a rounded step index profile, and a trapezoidal profile.

6. The dispersion compensating single mode waveguide of claim 5 in which α is in the range of about 0 to 6.

7. The dispersion compensating single mode waveguide of claim 3 in which the profile shape of annular segments 1 and 3 is a horizontal line and $\Delta_1\% = \Delta_3\%$ and $\Delta_1\%$ is substantially zero and $\Delta_2\%$ and $\Delta_4\%$ may individually take on values in the range of 0.2 to 0.6 times the value of $\Delta_c\%$.

8. The dispersion compensating single mode waveguide of claim 4 in which the profile shape of annular segments 1, 3, and 5 is a horizontal line and $\Delta_1\% = \Delta_3\% = \Delta_5\%$ and $\Delta_1\%$ is substantially zero and $\Delta_2\%$, $\Delta_4\%$ and $\Delta_6\%$ may individually take on values in the range of 0.2 to 0.6 times the value of $\Delta_c\%$.

9. The dispersion compensating single mode waveguide of claim 3 in which the profile shape of annular segments 2 and 4 is selected from the group consisting of an α profile, a rounded step index profile, and a trapezoidal profile.

10. The dispersion compensating single mode waveguide of claim 4 in which the profile shape of annular segments 2, 4, and 6 is selected from the group consisting of an α profile, a rounded step index profile, and a trapezoidal profile.

11. The dispersion compensating single mode waveguide of claim 7 in which the respective widths of the annular regions $w_1$, $w_2$, $w_3$, and $w_4$ are in the ranges 2.4 μm to 3.6 μm, 1.6 μm to 2.4 μm, 0.8 μm to 1.2 μm, and 1.6 μm to 2.4 μm.

12. The dispersion compensating single mode waveguide of claim 8 in which the respective widths $w_1$, $w_2$, $w_3$, $w_4$, $w_5$, and $w_6$ are in the ranges 2.9 μm to 4.4 μm, 1.25 μm to 1.90 μm, 0.75 μm to 1.10 μm, 0.9 μm to 1.35 μm, 0.9 μm to 1.35 μm, and 1.65 μm to 1.10 μm.

* * * * *